(12) United States Patent
Masoud

(10) Patent No.: US 12,098,078 B1
(45) Date of Patent: Sep. 24, 2024

(54) METHOD AND DEVICE FOR SAFELY GENERATING PURE AMMONIA FOR GC/CI-MS/MS AND ICP-MS APPLICATIONS

(71) Applicant: NAIF ARAB UNIVERSITY FOR SECURITY SCIENCES (NAUSS), Riyadh (SA)

(72) Inventor: Khaled Masoud Mohamed Masoud, Riyadh (SA)

(73) Assignee: NAIF ARAB UNIVERSITY FOR SECURITY SCIENCES (NAUSS), Riyadh (SA)

( * ) Notice: Subject to any disclaimer, the term of this patent is extended or adjusted under 35 U.S.C. 154(b) by 0 days.

(21) Appl. No.: 18/408,250

(22) Filed: Jan. 9, 2024

(51) Int. Cl.
*C01C 1/02* (2006.01)
*C01C 1/08* (2006.01)
*G01N 30/72* (2006.01)
*G01N 30/02* (2006.01)

(52) U.S. Cl.
CPC .............. *C01C 1/026* (2013.01); *C01C 1/024* (2013.01); *G01N 30/7206* (2013.01); *G01N 2030/025* (2013.01)

(58) Field of Classification Search
None
See application file for complete search history.

(56) References Cited

U.S. PATENT DOCUMENTS

| | | | |
|---|---|---|---|
| 8,765,086 B2 * | 7/2014 | Brok | B01D 53/1462 423/220 |
| 9,347,074 B1 | 5/2016 | Burke | |
| 2010/0300081 A1 * | 12/2010 | Fulks | C01C 1/006 60/299 |

FOREIGN PATENT DOCUMENTS

EP 3499547 A1 * 6/2019 .............. H01J 49/02

OTHER PUBLICATIONS

Evan Larson, "Pyrolysis-GC-MS and MALDI-MS methods to annotate and interpret complex examples", Iowa State University Digital Repository, Thesis pp. i-ix and 1-162, First available on line Nov. 9, 2022.

* cited by examiner

*Primary Examiner* — Wayne A Langel
(74) *Attorney, Agent, or Firm* — Nath, Goldberg & Meyer; Joshua B. Goldberg

(57) ABSTRACT

A method of supplying ammonia to a gas chromatography-chemical ionization tandem mass spectrometry (GC/CI-MS/MS) includes the steps of: providing ammonium carbonate and diethanolamine in a reaction vessel; heating the reaction vessel to a temperature of 50-60° C. to decompose the ammonium carbonate to form ammonia, carbon dioxide and water; absorbing the carbon dioxide and water by the diethanolamine to form diethanolamine carbonate; and supplying the ammonia to the GC/CI-MS/MS. Another method of supplying ammonia to a gas chromatography-chemical ionization tandem mass spectrometry (GC/CI-MS/MS) includes the steps of: providing ammonium carbonate and a mixture of monoethanolamine and diethanolamine in a reaction vessel; reacting the ammonium carbonate with the monoethanolamine to form ammonia and monoethanolamine carbonate; and supplying the ammonia to the GC/CI-MS/MS.

5 Claims, 7 Drawing Sheets

THE MASS SPECTRA OF COCAINE (a) AMMONIA-GENERATING METHOD AND (b) AMMONIA GAS CYLINDER.

METHOD AND DEVICE FOR SAFELY GENERATING PURE AMMONIA FOR GC/CI-MS/MS AND ICP-MS APPLICATIONS

BACKGROUND

1. Field

This present disclosure relates to a method and device for safely generating pure ammonia, in particular, a method and device for generating pure ammonia for use with Gas Chromatography-Chemical Ionization Tandem Mass Spectrometry (GC/CI-MS/MS) and Inductively Coupled Plasma-Mass Spectrometry (ICP-MS). Another application, the present invention is useful as source for ammonia for Collision/Reaction Cell (CRC) of ICP-MS and in any system/method requiring safe, portable and controlled delivery of ammonia, whereas storage of liquid ammonia is too hazardous.

2. Description of the Related Art

Chemical ionization (CI) is a soft ionization technique commonly used with GC-MS to confirm the molecular weight of various compounds. CI operates in two modes, positive chemical ionization (PCI) and electron capture negative ion chemical ionization (ECNI or NCI). Methane, isobutane, and ammonia are the most frequent reagent gases used to produce protonated [M+H]+ or radical anion [M·−] molecules in various CI techniques.

In comparison with EI, CI mode is ideal for mass spectrometry/mass spectrometry (MS/MS) applications because CI can provide fewer fragments with higher intensities of precursor ions, which is desired for any MS/MS application.

Compared to methane and isobutane, ammonia is a useful reagent gas for a highly sensitive GC-CI-MS/MS analysis. This is because ammonia generates a larger proportion of the [M+H]+ ion with fewer fragmentation ions due to the proton infinity of ammonia (204 kcal/mole) is higher than methane (132 kcal/mole) and isobutane (196 kcal/mole), therefore less energy is transferred in the ionization reaction. As a buffer gas in NCI, ammonia has approximately seven times the thermalizing power of methane. The applications of GC/CI-MS/MS using ammonia as a reagent gas range from forensic, clinical, toxicological, industrial, environmental, and pharmaceutical to food-related applications.

Moreover, the use of flammable gases such as methane or isobutane has some drawbacks in such areas as it promotes carbonization of the filament and ion source, which leads to high instrumental maintenance and short filament lifetimes. However, ammonia is toxic gas supplied as a compressed gas and is not allowed to be used in some laboratories due to their safety policy.

According to known technologies of using ammonia in chemical ionization, some precautions and recommendations are required. These precautions include (1) highly pure ammonia (99.99% pure) must be used with a flow rate of 1 mL/min, whereas the presence of water in ammonia will result in very short filament lifetimes and broadened peaks (water should be present at no more than 5 ppm); and (2) the pressure of the ammonia supply must be less than 5 psi, because higher pressures can result in ammonia condensing from gas to a liquid. It is recommended to use a mixture of 5% ammonia and 95% helium, or 5% ammonia and 95% methane as a CI reagent gas because this is enough ammonia to achieve good chemical ionization while minimizing its negative effects of ammonia on the vacuum pump fluids and seals.

To address these situations, there is a need to provide a safe pure ammonia-generating method and delivery device to provide (a) an average ammonia-releasing rate by controlling the temperature of the device, and (b) flowing other safety gases such as helium or nitrogen through the system to minimize the negative effects of high concentration of ammonia on vacuum pump fluids and seals.

Ammonia-generating materials such as ammonium carbonate $(NH_4)_2CO_3$ can be thermally decomposed to $2NH_3$, $CO_2$, and $H_2O$ by heating at 58° C. The percent of $NH_3$ in ammonium carbonate is 30-33% by weight, which is enough ammonia to analyze more than 1000 samples from 100 grams of ammonium carbonate, whereas one gram of $NH_3$ is equivalent to 1297.02 milliliters of ammonia gas volume.

The thermal decomposition of ammonia carbonate has the disadvantages of these methods are not generating pure ammonia ($H_2O$ and $CO_2$ present). Accordingly, such methods are not recommended sources of ammonia for GC/CI-MS/MS applications. Moreover, as soon as these gases cool down below 50° C., they immediately react with each other and form $(NH_4)_2CO_3$ back.

SUMMARY

The present disclosure provides a solution to the safety challenges of using compressed ammonia in a gas cylinder with GC/CI-MS/MS and ICP-MS apparatuses.

In particular, the present disclosure is directed to a method of supplying ammonia to a gas chromatography-chemical ionization tandem mass spectrometry (GC/CI-MS/MS). The present method includes the steps of: providing ammonium carbonate and diethanolamine in a reaction vessel; heating the reaction vessel to a temperature of 50-60° C. to decompose the ammonium carbonate to form ammonia, carbon dioxide and water; absorbing the carbon dioxide and water by the diethanolamine to form diethanolamine carbonate; and supplying the ammonia to the GC/CI-MS/MS.

In an embodiment, the method further includes heating the diethanolamine carbonate to release carbon dioxide and water, and regenerate the diethanolamine. In a particular embodiment, the diethanolamine carbonate is heated at 150° C. for 2 hours.

In a further embodiment, the ammonia carbonate and the diethanolamine are provided in the reaction vessel in a 1:2 weight ratio.

The present disclosure is also drawn to a method of supplying ammonia to a gas chromatography-chemical ionization tandem mass spectrometry (GC/CI-MS/MS). The method includes the steps of: providing ammonium carbonate and a mixture of monoethanolamine and diethanolamine in a reaction vessel; reacting the ammonium carbonate with the monoethanolamine to form ammonia and monoethanolamine carbonate; and supplying the ammonia to the GC/CI-MS/MS.

In an embodiment, the method further includes heating the monoethanolamine carbonate to release carbon dioxide and water and regenerate the monoethanolamine. In a particular embodiment, the monoethanolamine carbonate is heated at 150° C. for 2 hours.

In a further embodiment, the ammonia carbonate and the mixture of monoethanolamine and diethanolamine are provided in the reaction vessel in a 1:2 weight ratio.

In a still further embodiment, the mixture of monoethanolamine and diethanolaminer includes 50% by weight monoethanolamine and 50% by weight diethanolamine.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides a solution to the safety challenge of using a compressed ammonia gas cylinder with GC/CI-MS/MS and ICP-MS.

In particular, the present subject matter relates to a method and device for safety generating of pure ammonia by reaction the ammonium carbonate with monoethanolamine (MEA) and diethanolamine (DEA) in a stainless-steel reaction vessel connected to a heating control device.

The generation of pure ammonia gas is based on two methods: (1) thermal decomposition of ammonium carbonate to ammonia, carbon dioxide, and water (2:1:1), and then absorbing of $CO_2$ and $H_2O$ by DEA; and (2) direct reaction of ammonium carbonate (less stable form) with MEA to form ammonia gas and MEA carbonates (more stable form). In addition, the present contemplates recycling/regenerating of MEA and DEA for another batch of ammonia production by heating their carbonate/carbamate derivatives at 150° C. for 2 hours.

According to the present subject matter, the disclosed method and device provide at least two advantages, namely (a) an average ammonia-releasing rate by controlling the temperature of the device, and (b) flowing other gases such as helium or nitrogen through the system to minimize the negative effects of a high concentration of ammonia on the vacuum pump fluids and seals of the GC-MS/MS. With respect to the development of the present subject matter, several parameters such as repeatability of the analysis, potential interferences of alkanolamines on the mass quality, and the ratio of water and oxygen after several injections of samples are studied to evaluate any negative effects of the present generating ammonia on GC-MS/MS performance or the analysis. Based on the results discussed below, the present generating ammonia device provides pure ammonia the same as the ammonia gas cylinder.

Alkanolamines such as monoethanolamine (MEA) and diethanolamine (DEA) are used as $CO_2$ capture in industrial processes. Specifically, alkanolamines are highly boiling points, very low vapor pressure, stable, non-flammable, cheap and safe to handle compounds. $CO_2$ is typically absorbed by the amine function groups of alkanolamines to form carbonates (in the presence of $H_2O$) or carbamates by Zwitterion mechanism. This reaction is reversible, and alkanolamines can be recycled by heating their carbonates at 130-150° C. to release $CO_2$ and $H_2O$.

Figure 1:
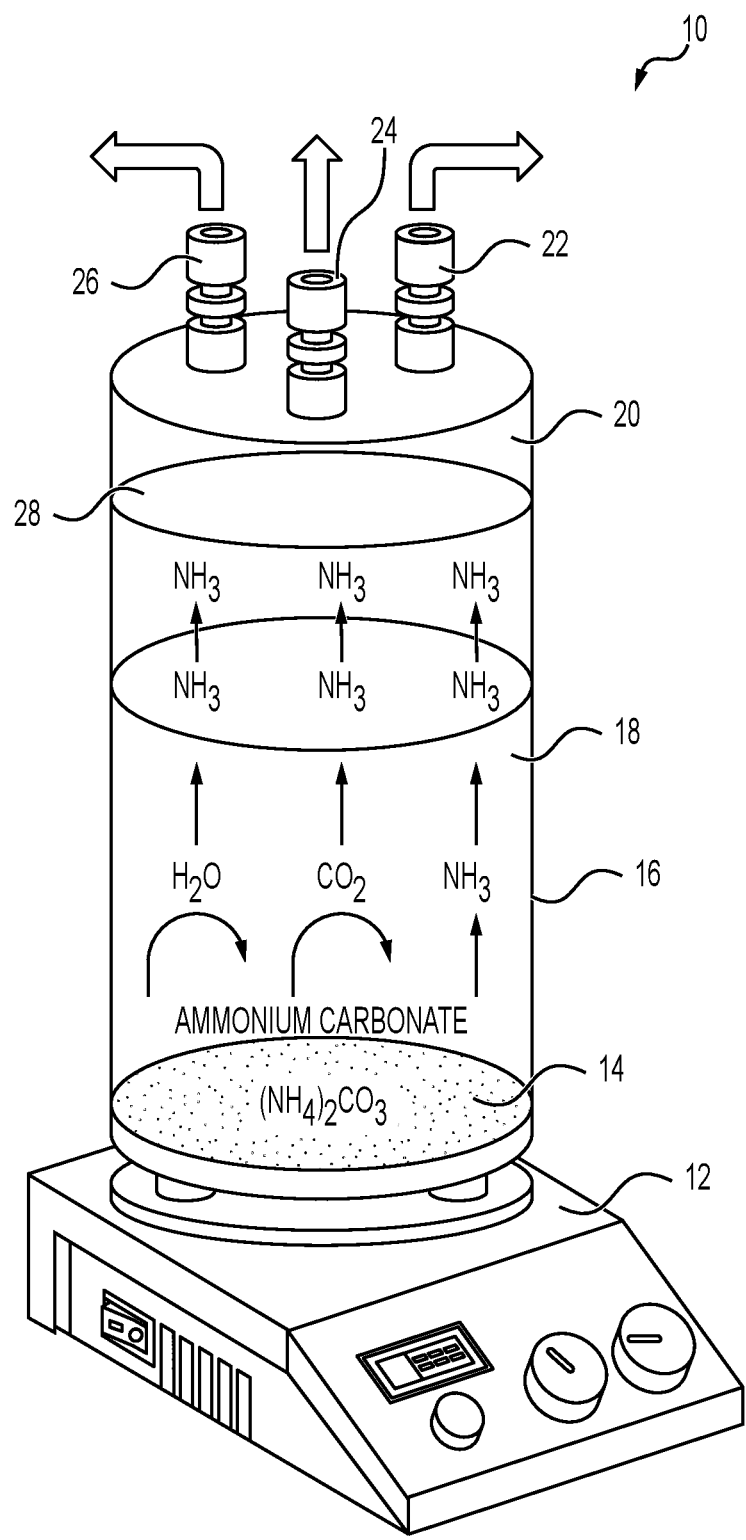
FIG. 1 shows the elements and functions of the ammonia-generating device.

FIG. 1 depicts a set-up for a reaction vessel capable of generating pure ammonia to be supplied to GC/CI-MS/MS and ICP-MS. In particular, reaction vessel 10 has a body 16 which forms a reservoir that holds the various reactants. Body 16 can be made of any suitable material, including stainless steel in a non-limiting example. A lower portion of body 16 is positioned on a heating element 12. Heating element 12 is utilized to maintain the temperature of the elements found in the reservoir. In a non-limiting example, heating element 12 is a hot plate that allows for temperature control of the reactants.

Loaded into the bottom of the reservoir of the body 16 is a powder 14 of ammonium carbonate $(NH_4)_2CO_3$. A reaction liquid 18 is then loaded into the reaction vessel. Following loading of the reaction liquid 18, a filter 28 is positioned in an upper part of body 16, followed by attaching a cap 20 to seal the reaction vessel. The cap 20 is the same material as the body 16. In an embodiment, the filter 28 is a cellulose filter and the cap 20 is made of stainless steel. The filter 28 is positioned to keep any material other than ammonia from exiting reaction vessel 10. Three connections 22, 24, 26 are located in cap 20. One connection 22 connects the reaction vessel to the GC/CI-MS/MS and ICP-MS. A second connection 24 is a fitting for connecting nitrogen or helium gas to the reaction vessel. A third connection 26 is a connection fitting for connecting a pressure gauge to monitor the pressure of the ammonia gas generated in reaction vessel 10.

In an embodiment, reaction liquid 18 is DEA. In this embodiment, the ammonium carbonate and the reaction liquid are added in a 1:2 weight ratio. While this embodiment discloses a 1:2 weight ratio of ammonium carbonate to reaction liquid, other weight ratios are also contemplated as being within the scope of this disclosure. Other ammonium carbonate to reaction liquid weight ratios contemplated include, without limitation; 1:1; 1:1.5; 1:2; 1:2.5; and 1:3.

In another embodiment, reaction liquid 18 is a mixture of MEA and DEA. In this embodiment, the ammonium carbonate and the reaction liquid are added in a 1:2 weight ratio, and the weight ratio of MEA to DEA is 1:1, resulting in an overall weight ratio of ammonium carbonate to MEA to DEA is 1:1:1. While this embodiment discloses a 1:2 weight ratio of ammonium carbonate to reaction liquid, other weight ratios are also contemplated as being within the scope of this disclosure. Other ammonium carbonate to reaction liquid weight ratios contemplated include, without limitation, 1:0.5; 1:1; 1:1.5; 1:2; 1:2.5; and 1:3. Likewise, other weight ratios of MEA to DEA are also contemplated, including non-limiting examples of 0.5:1; 0.75:1; 1:0.75; and 1:0.5.

The present subject matter employs the reaction vessel described above to generate pure ammonia to be fed to the GC/CI-MS/MS and ICP-MS. The method of generating pure ammonia is based on one of two chemical reactions: (1)

thermal decomposition of ammonium carbonate to $2NH_3$, $CO_2$, and $H_2O$, and absorbing $CO_2$, and $H_2O$ by DEA; or (2) replacement of ammonia by alkylamino group of MEA, and DEA to form more stable carbonates. Alkyl amines have stronger basicity than ammonia, because the electron donating inductive effect of the alkyl groups ($NH—CH_2—CH_2—$) increases the electron density around the nitrogen, thereby, nucleophilic substitution of ammonium by amine group to form a more stable anionic salt. In accordance with the present subject matter, MEA and DEA can be recycled/regenerated for other batches of ammonia by heating their carbonate derivatives at 150° C. for 2 hours. One more advantage of this method is visually monitoring the method, whereas carbonate salt of MEA and DEA is very soluble in both chemicals (due to MEA and DEA having hydroxy groups abilities to dissolve carbonate salt) that makes the method easy to monitor the quantity of ammonium carbonate, whereas ammonium carbonate is not soluble in MEA and DEA.

One reaction mechanism to generate the pure ammonia is by thermal decomposition. This mechanism follows as:

$(NH_4)_2CO_3+\text{Heating}\rightarrow 2NH_3(\text{gas})+CO_2(\text{gas})+H_2O$

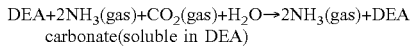

$DEA+2NH_3(\text{gas})+CO_2(\text{gas})+H_2O\rightarrow 2NH_3(\text{gas})+DEA$ carbonate(soluble in DEA)

The DEA can be regenerated or recycled by heating the DEA carbonate/carbamate according to: DEA carbonate/carbamate+Heating at 150° C.→DEA+$CO_2$+$H_2O$.

In this embodiment, due to DEA being very slow for interacting with the ammonium carbonate at ambient temperature, the generation of moderate ammonia is controlled by increasing the temperature. Using a temperature within a range of 40-60° C. increases the reaction rate and decomposes ammonium carbonate to ammonia, $CO_2$, and $H_2O$, with the carbon dioxide and water being absorbed by the DEA. The advantages of using DEA as an absorbing agent in this method are a very low vapor pressure (<1 Pa (at 20° C.)), a high boiling point (271.1° C.), and the method is generally inexpensive.

In another embodiment, pure ammonia is generated by a replacement reaction according to:

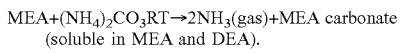

$MEA+(NH_4)_2CO_3 RT\rightarrow 2NH_3(\text{gas})+MEA$ carbonate (soluble in MEA and DEA).

As with the embodiment above, MEA can be regenerated/recycled by heating the MEA carbonate according to: MEA carbonate+Heating at 150° C.→MEA+$CO_2$+$H_2O$ In this embodiment, due to MEA interacting strongly with ammonium carbonate at ambient temperature, DEA is mixed with the MEA to slow the reaction rate and generate ammonia at an average rate (1-25 psi), based on MEA and DEA ratio, and amount of ammonium carbonate. It is noted that the reaction of MEA with ammonium carbonate was associated with dropping in the temperature of the medium (an endothermic reaction). The average ammonia-releasing rate can be controlled by increasing the temperature from 20-45° C. or changing the MEA and DEA ratio. It is noted that adding water drops during the regeneration process of MEA or DEA carbonate/carbamate increases the decomposition rate and therefore reduces the reaction period. It has been noted that using a stirrer tool inside the reservoir helps to release ammonia above the aqueous layer. In developing the present subject matter, other sources of ammonium were also tested in the above methods. Ammonium carbamate was tested as a source of ammonia. Pure ammonia is generated as same as ammonium carbonate. The advantage of using ammonium carabamate is that no $H_2O$ is formed, while the disadvantage is the ammonium carbamate is expensive compared to ammonium carbonate. Another ammonia-generating material such as ammonium chloride ($NH_4CL$) was tested as a source of ammonia. MEA generates ammonia at room temperature, while DEA at 70° C. The disadvantage of using ammonium chloride is that the hydrochloride salt of alkanolamines cannot be recycled for future batches.

An aspect of the present subject matter is that the pure ammonia generated by the above methods is fed to various analytical equipment. With respect to MS/MS, when in operation, the high vacuum of ions source and MS/MS help ammonia gas to enter the instrument with a constant flow rate because the MS/MS operates under a high vacuum and functions to control the flow rate of reagent gases. Furthermore, with respect to the development of the subject matter, several parameters such as repeatability of the analysis, potential interferences of DEA on the mass quality, and the ratio of water and oxygen after several injections of samples were studied to evaluate any negative effects of the present generating ammonia on GC-MS/MS performance or the analysis. The repeatability of the analysis was evaluated by running 150 samples in different three days. Potential interferences of DEA on the chromatogram or mass spectra were determined by analysis of solvent (methanol) and drug standards using an ammonia gas cylinder and using the presented generating-ammonia advice. GC-MS/MS performance has checked the ratio of water and oxygen before and after the analysis of 100 samples by the presented generating-ammonia advice. Based on the results, the present generating ammonia device provides pure ammonia the same as the ammonia gas cylinder.

Figure 2:
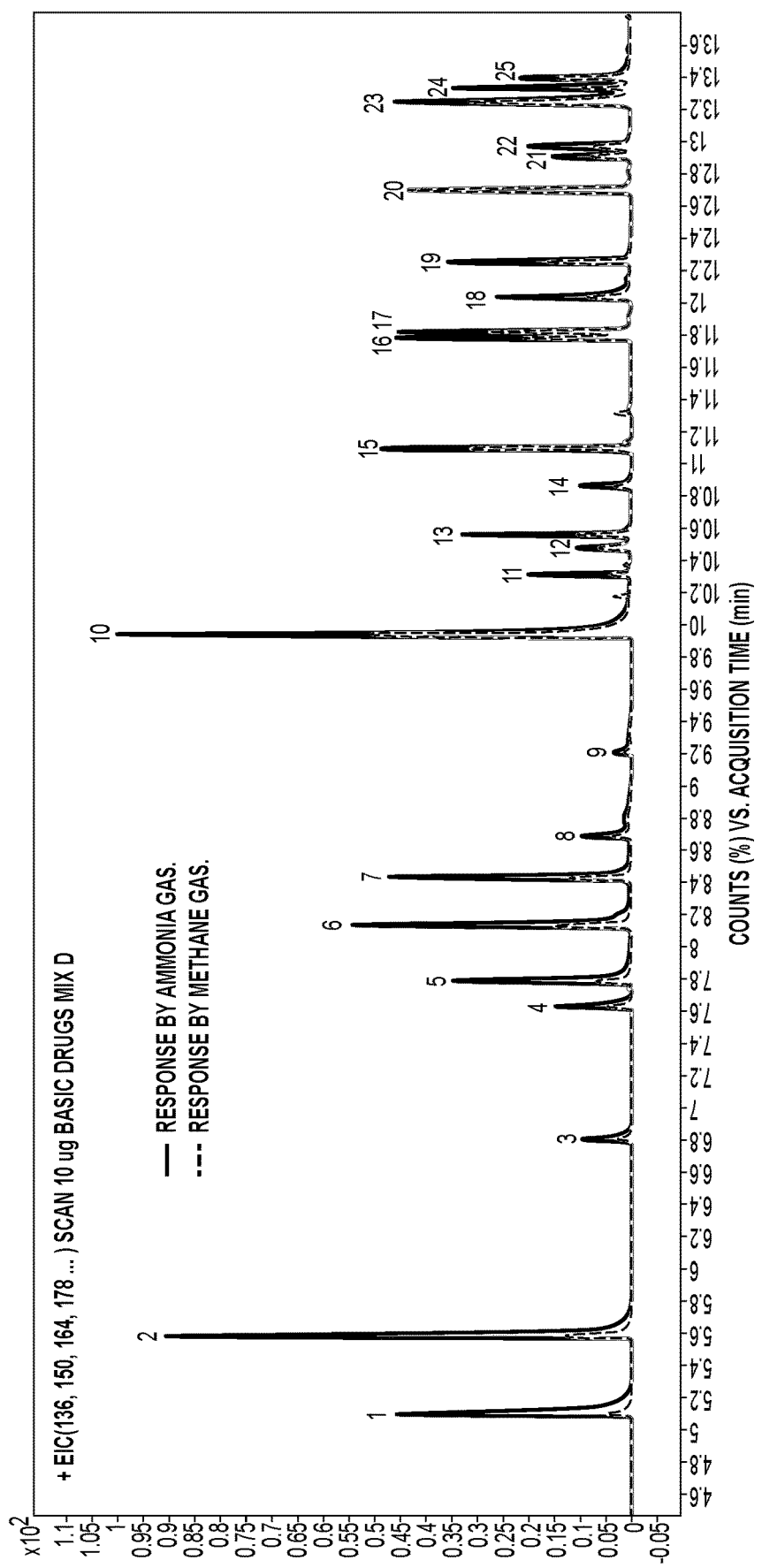
FIG. 2 shows GC-MS/MS chromatograms for the analysis of 24 drugs using methane and ammonia as reagent gas. As presented in the figure, the responses by ammonia are approximately seven to ten times that of methane.

Particular results of various testing parameters are as shown in the following Figures;

FIG. 2 shows overlapping chromatograms for the analysis of 10 μg/ml of 24 drugs using ammonia generated from the above methods and methane as reagent gases. In particular, the chromatograms are for (1) amphetamine; (2) methamphetamine; (3) methcathinone; (4) methadrone; (5) 3,4-methulenedioxyamphetamine (MDA); (6) 2,3,4-methylenedioxymethamphetamine (MDMA); (7)3,4-methylenedioxyethylamphetamine (MDEA); (8) methedrone; (9) methylone; (10) caffeine; (11) phencyclidine (PCP); (12) 2,5-dimethoxy-4-methylphenethylamine (2C-D); (13) tramadol; (14) chlorpheniramine; (15) 3',4'-methylene-α-pyrrolidinobutiophenone (MDPBP); (16) amitriptyline; (17) cocaïne; (18) desipramine; (19) naphyrone; (20) codeine; (21) diazepam; (22) nordiazepam; (23) oxycodone; and (24) 6-monoacetylmorphine (6-MAM).

Figure 3:
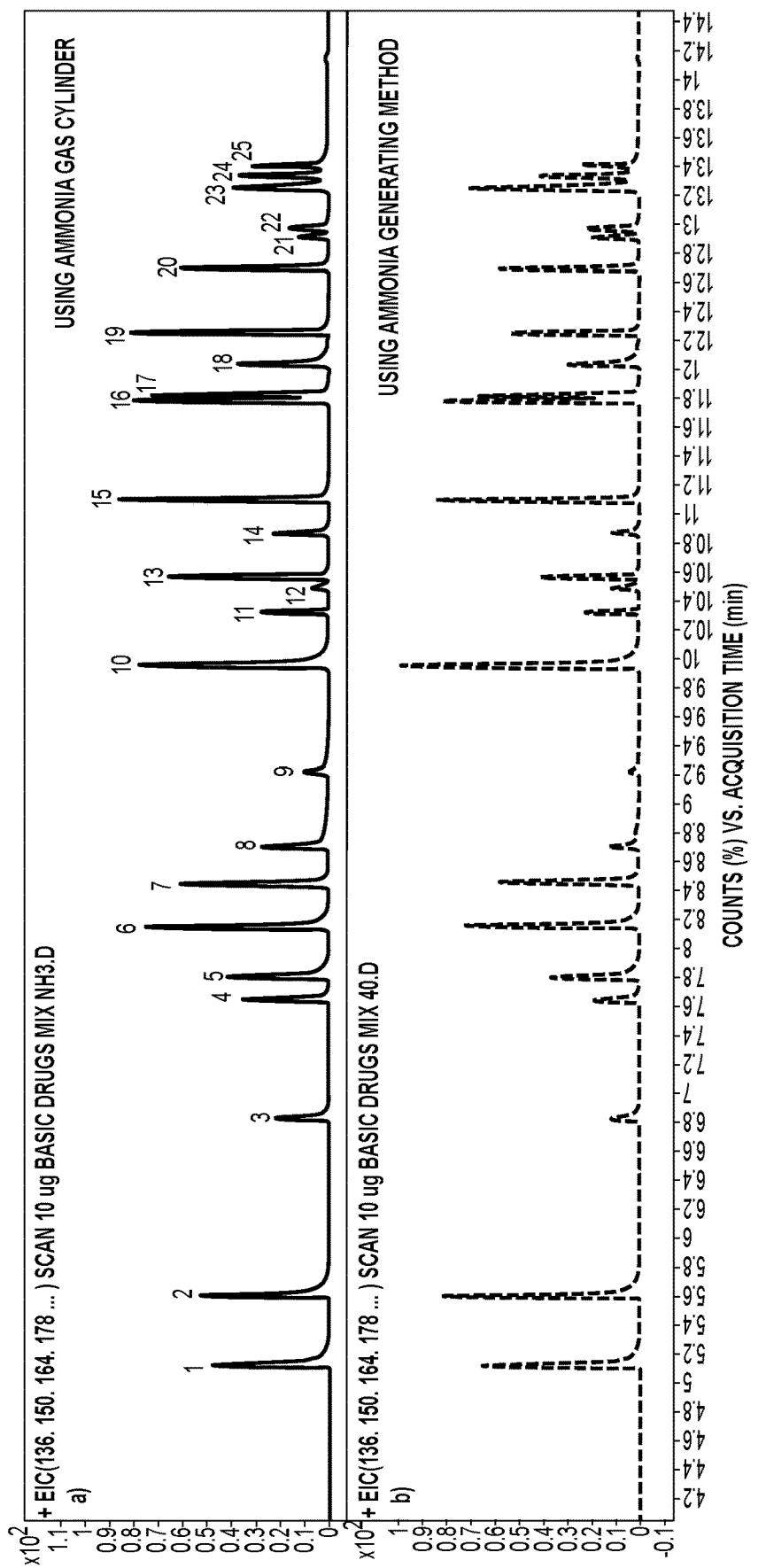
FIG. 3 shows GC-MS/MS chromatograms for the analysis of 10 ug/ml of 24 drugs using an ammonia gas cylinder and the ammonia-generating device using 1 ml/min ammonia as reagent gas. As presented in the chromatograms the response by the present ammonia-generating device is the same as the ammonia gas cylinder.

FIG. 3 shows GC-MS/MS chromatograms for the analysis of 10 μg/ml of 24 drugs using ammonia from a typical gas cylinder and ammonia generated from the above methods as reagent gases. In particular, the chromatograms are for (1) amphetamine; (2) methamphetamine; (3) methcathinone; (4) methadrone; (5) 3,4-methulenedioxyamphetamine (MDA); (6) 2,3,4-methylenedioxymethamphetamine (MDMA); (7)3,4-methylenedioxyethylamphetamine (MDEA); (8) methedrone; (9) methylone; (10) caffeine; (11) phencyclidine (PCP); (12) 2,5-dimethoxy-4-methylphenethylamine (2C-D); (13) tramadol; (14) chlorpheniramine; (15) 3',4'-methylene-α-pyrrolidinobutiophenone (MDPBP); (16) amitriptyline; (17) cocaine; (18) desipramine; (19) naphyrone; (20) codeine; (21) diazepam; (22) nordiazepam; (23) oxycodone; and (24) 6-monoacetylmorphine (6-MAM).

Figure 4:
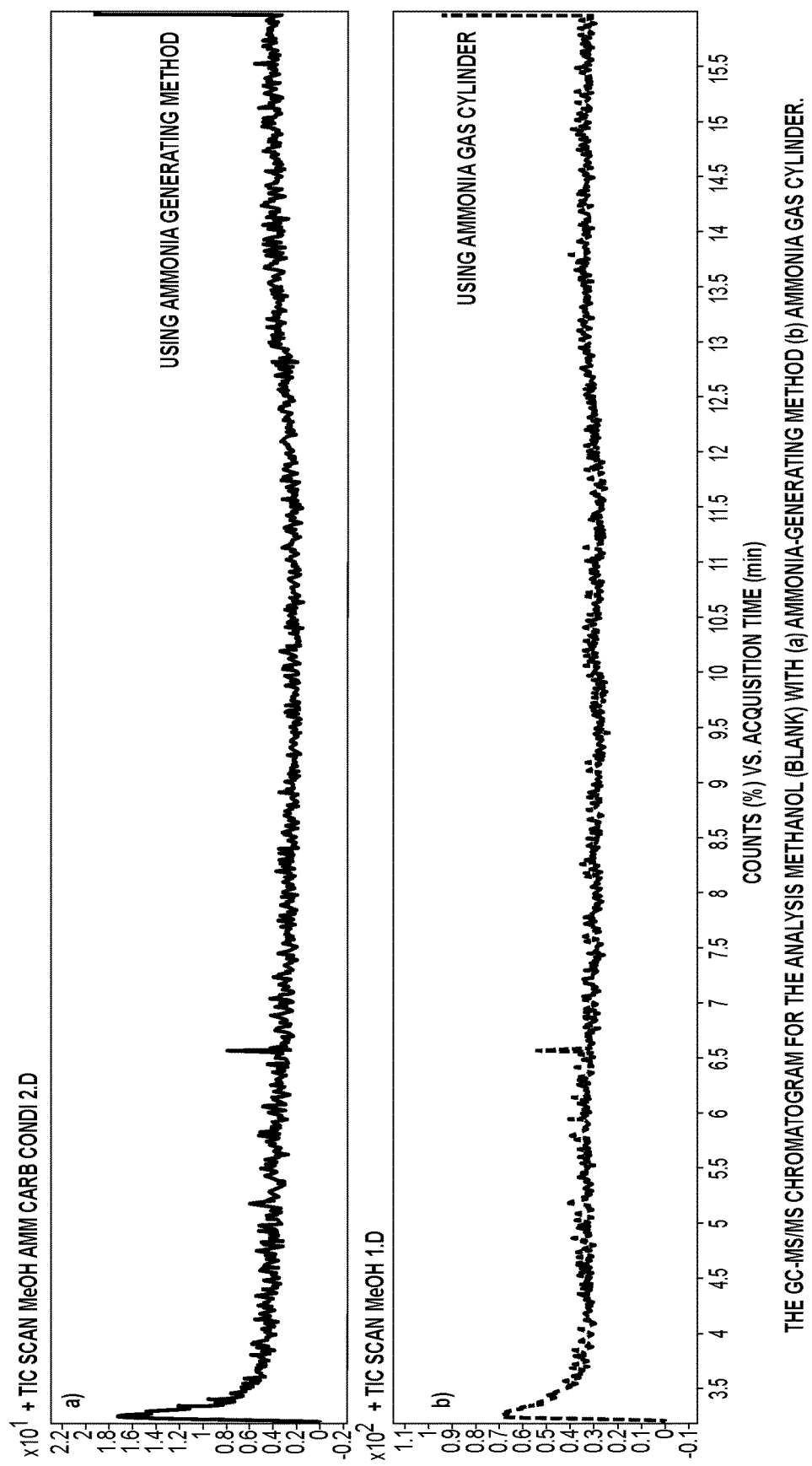
FIG. 4 shows GC-MS/MS chromatograms for the analysis of blank (methanol) by ammonia gas cylinder and the ammonia-generating device. As shown in the chromatogram, the background noise generated by the ammonia gas cylinder is the same as a present ammonia-generating device.

FIG. 4 shows a chomatogram for the analysis of methanol (blank) with ammonia from the above methods and ammonia from a typical gas cylinder.

Figure 5A:
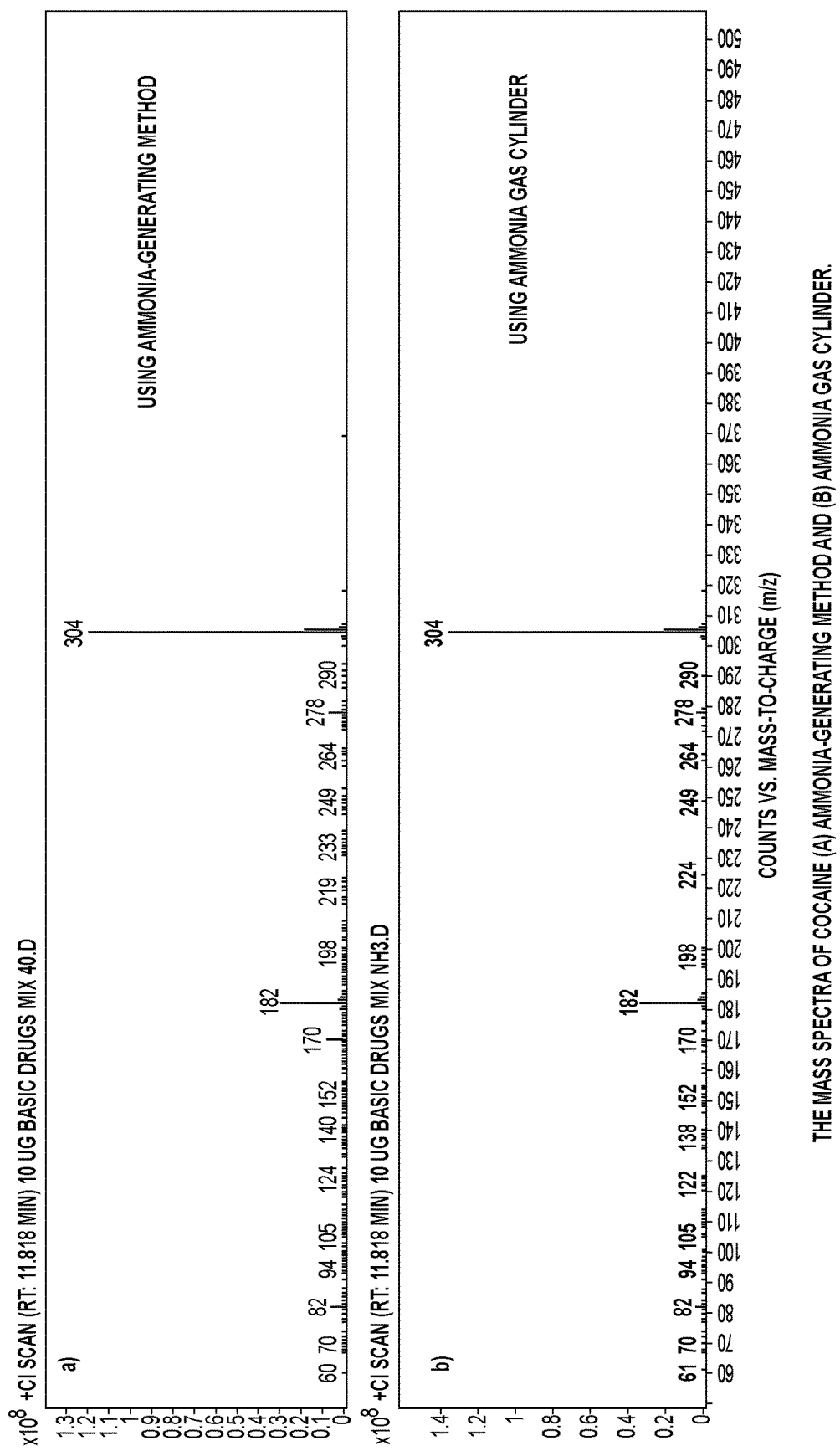
FIGS. 5A and 5B show the mass spectra for cocaine (FIG. 5A) and codeine (FIG. 5B) generated by the ammonia gas cylinder and the ammonia-generating device.

FIG. 5A shows the mass spectra of cocaïne with ammonia from the above methods and ammonia from a typical gas cylinder.

Figure 5B:
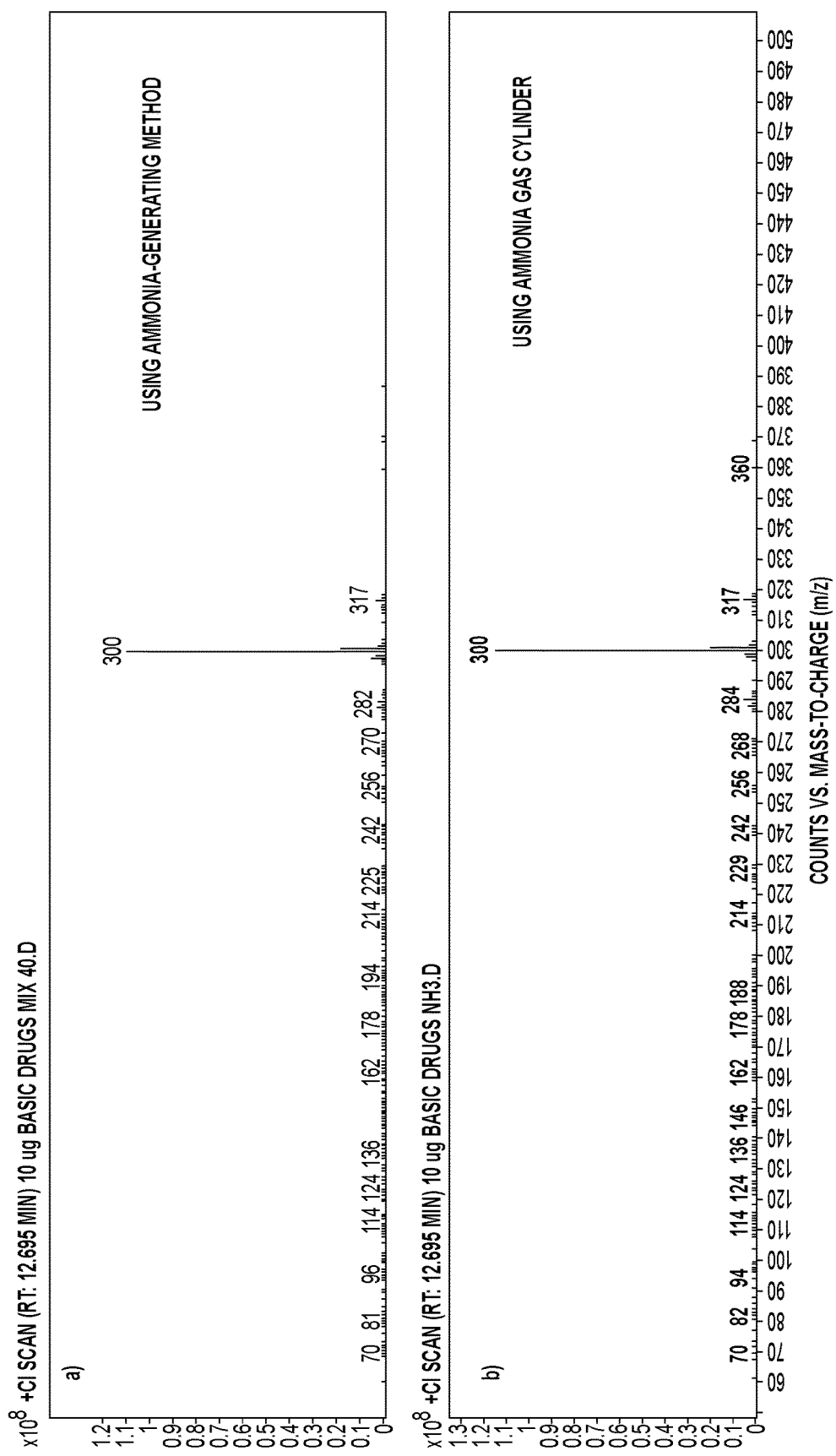

FIG. 5B shows the mass spectra of codeine with ammonia from the above methods and ammonia from a typical gas cylinder.

Figure 6:
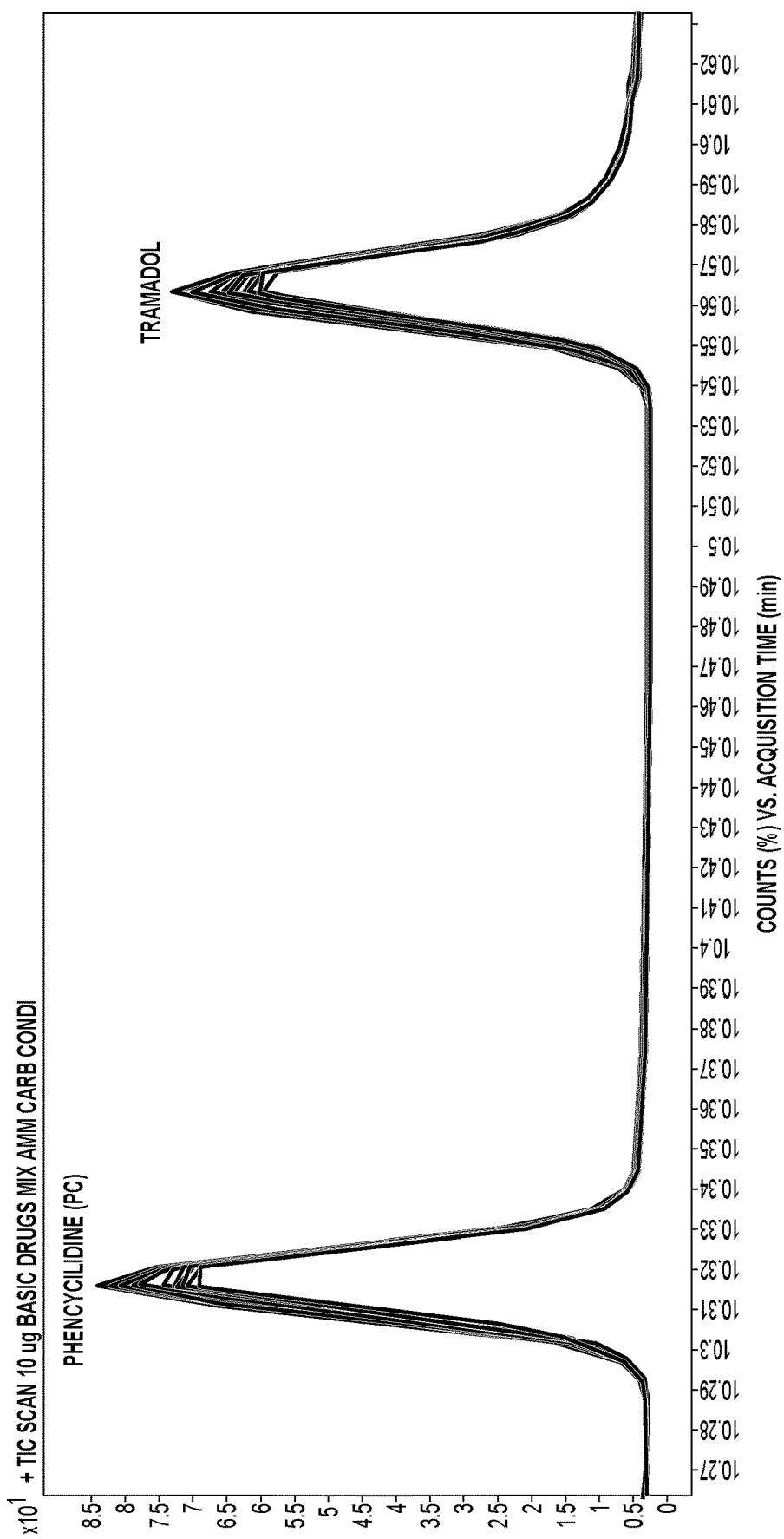
FIG. 6 shows GC-MS/MS chromatograms for the repeated analysis of 10 ug/ml of 25 drugs using the present ammonia-generating device.

FIG. 6 shows chromatograms for 20 repeated analyses of drug standards using ammonia generated by the above methods.

As can be seen from FIGS. 2-6, the use of ammonia from the above methods mimics well with respect to standard ammonia sources. Thus, it is contemplated that the above methods generate ammonia sufficient for use in various analytical equipment.

It is to be understood that the present subject matter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of supplying ammonia to a gas chromatography-chemical ionization tandem mass spectrometry (GC/CI-MS/MS) comprising the steps of:
   providing ammonium carbonate and a mixture of monoethanolamine and diethanolamine in a reaction vessel;
   reacting the ammonium carbonate with the monoethanolamine to form ammonia and monoethanolamine carbonate; and
   supplying the ammonia to the GC/CI-MS/MS.

2. The method according to claim 1 further comprising heating the monoethanolamine carbonate to release carbon dioxide and water, and regenerate the monoethanolamine.

3. The method according to claim 2, wherein the monoethanolamine carbonate is heated at 150° C. for 2 hours.

4. The method according to claim 1 wherein the ammonium carbonate and the mixture of monoethanolamine and diethanolamine are provided in the reaction vessel in a 1:2 weight ratio.

5. The method according to claim 1 wherein the mixture of monoethanolamine and diethanolamine comprises 50% by weight monoethanolamine and 50% by weight diethanolamine.

* * * * *